United States Patent
Kerekes et al.

(10) Patent No.: US 9,415,544 B2
(45) Date of Patent: Aug. 16, 2016

(54) WALL SMOOTHNESS, FEATURE ACCURACY AND RESOLUTION IN PROJECTED IMAGES VIA EXPOSURE LEVELS IN SOLID IMAGING

(75) Inventors: Thomas Alan Kerekes, Calabasas, CA (US); Jouni P. Partanen, Palo Alto, CA (US); Yong Chen, Valencia, CA (US); Charles W. Hull, Santa Clarita, CA (US)

(73) Assignee: 3D Systems, Inc., Rock Hill, SC (US)

( * ) Notice: Subject to any disclaimer, the term of this patent is extended or adjusted under 35 U.S.C. 154(b) by 589 days.

(21) Appl. No.: 11/468,090

(22) Filed: Aug. 29, 2006

(65) Prior Publication Data

US 2008/0054531 A1 Mar. 6, 2008

(51) Int. Cl.
B29C 67/00 (2006.01)

(52) U.S. Cl.
CPC ......... B29C 67/0066 (2013.01); B29C 67/0088 (2013.01); *B29K 2995/0073* (2013.01)

(58) Field of Classification Search
CPC ................. B29C 67/0066; B29C 67/0088
USPC ....................................... 264/401
See application file for complete search history.

(56) References Cited

U.S. PATENT DOCUMENTS

| | | |
|---|---|---|
| 4,752,498 A | 6/1988 | Fudim |
| 4,851,656 A | 7/1989 | Straayer |
| 5,009,585 A | 4/1991 | Hirano et al. |
| 5,049,901 A | 9/1991 | Gelbart |
| 5,130,064 A | 7/1992 | Smalley et al. |
| 5,184,307 A * | 2/1993 | Hull et al. ............. 700/182 |
| 5,247,180 A | 9/1993 | Mitcham et al. |
| 5,454,069 A | 9/1995 | Knapp et al. |
| 5,506,607 A | 4/1996 | Sanders et al. |
| 5,510,066 A | 4/1996 | Fink et al. |
| 5,523,193 A | 6/1996 | Nelson |
| 5,528,733 A * | 6/1996 | Luttmer ............. 358/1.7 |
| 5,557,327 A | 9/1996 | Hasegawa et al. |
| 5,650,260 A | 7/1997 | Onishi |

(Continued)

FOREIGN PATENT DOCUMENTS

| | | | |
|---|---|---|---|
| DE | 02008019 | 9/1970 | |
| DE | 19957370 A1 | 11/1999 | ............ B05D 1/18 |

(Continued)

OTHER PUBLICATIONS

Dictionary.com definition for Bitmap from the american Heritage, 4th edition (2009).*

(Continued)

*Primary Examiner* — Alison L Hindenlang

(57) ABSTRACT

A solid imaging apparatus and method employing levels of exposure varied with gray scale or time or both of digitally light projected image of a cross-section of a three-dimensional object on a solidifiable photopolymer build material. The gray scale levels of exposure of projected pixels permits the polymerization boundaries in projected boundary pixels to be controlled to achieve preserved image features in a three-dimensional object and smooth out rough or uneven edges that would otherwise occur using digital light projectors that are limited by the number of pixels in an image projected over the size of the image. Software is used to control intensity parameters applied to pixels to be illuminated in the image projected in the cross-section being exposed in the image plane.

19 Claims, 14 Drawing Sheets

(56) References Cited

U.S. PATENT DOCUMENTS

| | | | |
|---|---|---|---|
| 5,693,144 | A | 12/1997 | Jacobs et al. |
| 5,768,134 | A | 6/1998 | Swaelens et al. |
| 5,894,036 | A | 4/1999 | Tylko |
| 5,900,207 | A | 5/1999 | Danforth et al. |
| 5,902,537 | A | 5/1999 | Almquist et al. |
| 6,001,297 | A | 12/1999 | Partanen et al. |
| 6,029,096 | A | 2/2000 | Manners et al. |
| 6,048,487 | A | 4/2000 | Almquist et al. |
| 6,051,179 | A | 4/2000 | Hagenau |
| 6,215,095 | B1 | 4/2001 | Partanen et al. |
| 6,312,134 | B1 * | 11/2001 | Jain et al. ............... 359/855 |
| 6,399,010 | B1 | 6/2002 | Guertin et al. |
| 6,500,378 | B1 | 12/2002 | Smith |
| 6,508,971 | B2 | 1/2003 | Fedchenko et al. |
| 6,547,552 | B1 | 4/2003 | Fudim |
| 6,665,048 | B2 | 12/2003 | Gelbart |
| 6,833,231 | B2 | 12/2004 | Moussa et al. |
| 6,833,234 | B1 | 12/2004 | Bloomstein et al. |
| 6,855,482 | B2 * | 2/2005 | McLean et al. ............ 430/302 |
| 7,088,432 | B2 * | 8/2006 | Zhang ............... 355/77 |
| 7,154,515 | B2 * | 12/2006 | Donahue et al. .......... 345/686 |
| 7,636,610 | B2 | 12/2009 | Schillen et al. |
| 7,758,799 | B2 | 7/2010 | Hull et al. |
| 7,790,093 | B2 | 9/2010 | Shkolnik et al. |
| 7,831,328 | B2 | 11/2010 | Schillen et al. |
| 2001/0048184 | A1 | 12/2001 | Ueno |
| 2004/0075882 | A1 | 4/2004 | Meisburger |
| 2005/0089214 | A1 * | 4/2005 | Rubbert et al. ............ 382/154 |
| 2005/0248061 | A1 | 11/2005 | Shkolnik et al. |
| 2005/0248062 | A1 * | 11/2005 | Shkolnik et al. ............ 264/401 |
| 2005/0259785 | A1 * | 11/2005 | Zhang ............... 378/34 |
| 2006/0239588 | A1 * | 10/2006 | Hull et al. ............ 382/285 |
| 2007/0029706 | A1 * | 2/2007 | Ueno ............... 264/401 |
| 2010/0048184 | A1 | 2/2010 | Kim |

FOREIGN PATENT DOCUMENTS

| | | |
|---|---|---|
| DE | 19929199 A1 | 1/2001 |
| EP | 0676275 | 10/1995 |
| EP | 1192041 B1 | 3/2003 |
| EP | 1849587 A1 | 10/2007 |
| EP | 1864785 | 12/2007 |
| EP | 2266781 | 12/2010 |
| FR | 2692053 | 12/1993 |
| JP | 1995108609 | 4/1995 |
| JP | 2002210834 | 7/2002 |
| WO | 9804950 | 2/1998 |
| WO | 9963385 | 12/1999 |
| WO | WO0140866 A2 | 6/2001 |
| WO | WO 02/36331 | 5/2002 |
| WO | WO 2005025838 A1 * | 3/2005 ............. B29C 67/00 |
| WO | WO 2005110722 A1 | 11/2005 |
| WO | WO 2006/109425 | 10/2006 |

OTHER PUBLICATIONS

English Translation of DE 19957370A1.

"European Search Report" and European Search Opinion for European Counterpart Patent Application No. EP 07016909.9, dated Jan. 8, 2008, 9 pages.

"European Search Report" for European Patent Application No. EP 06251474.0, dated Jan. 31, 2008, 4 pages.

"European Search Report" for European Patent Application No. EP 06251473.2, dated Jan. 31, 2008, 4 pages.

IEIC Technical Report dated Sep. 2001 by K Takahashi entitled "A New Application of DMD to Photolithography and Rapid Prototyping System".

A Thesis dated Jun. 2008 by Jonathan Zyzalo,"Masked Projection Stereolithography: Improvement of the Limaye Model for Curing Single Layer Medium Sized Parts" (pp. i-xiii;1-75).

A Thesis dated Jun. 2008 by Jonathan Zyzalo,"Masked Projection Stereolithography: Improvement of the Limaye Model for Curing Single Layer Medium Sized Parts" (pp. 76-168).

A Thesis dated Jun. 2008 by Jonathan Zyzalo,"Masked Projection Stereolithography: improvement of the Limaye Model for Curing Single Layer Medium Sized Parts" (pp. 169-260).

Notice of Opposition Against European Patent No. EP 2148244 received at the European Patent Office on Oct. 3, 2012 (39 pages).

English translation of Japanese Notice of Grounds for Rejection dated Jan. 15, 2013 ( 3 pages).

English translation of Japanese Office Action, dated Aug. 2, 2011, of Japanese counterpart.

"Rigorous Simulation of 3D Masks", Burger et al, Zuse Institute Berlin, Oct. 24, 2006.

Zhenhai Zhu:, "A parameterized mask model for lithography simulation," Design Automation Conference 2009, Jul. 26-31, 2009.

* cited by examiner

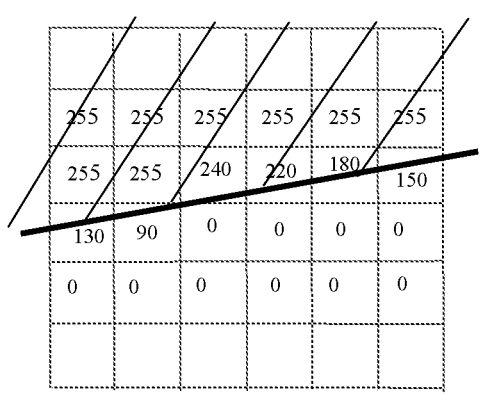 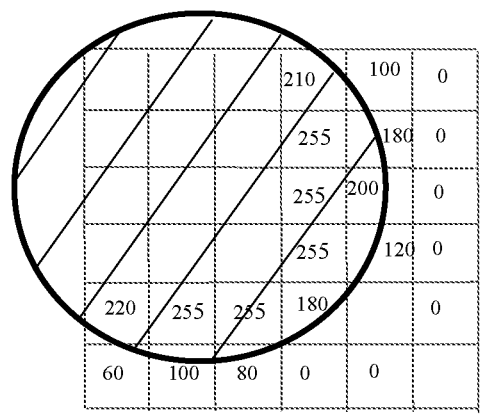
FIG. 12                    FIG. 13

WALL SMOOTHNESS, FEATURE ACCURACY AND RESOLUTION IN PROJECTED IMAGES VIA EXPOSURE LEVELS IN SOLID IMAGING

FIELD OF INVENTION

The present invention is directed to a technique to achieve improved wall smoothness and feature accuracy in an image projection system limited by the projected size of the pixels, such as occurs with light valve projectors using DMD or LCD based projectors, for use in an apparatus for forming three-dimensional objects on a layer-by-layer basis. More particularly, it is directed to an apparatus and method for forming three-dimensional objects using exposure levels varied with gray scale or time or both in a projected image to obtain enhanced smoothness in the x, y-plane and on the z-axis edge, feature accuracy, and better resolution in the three-dimensional object being formed from a solidifiable photopolymerizable medium in response to exposure by UV or visible light.

BACKGROUND OF THE INVENTION

In recent years, many different techniques for the fast production of three-dimensional models have been developed for industrial use. These solid imaging techniques are sometimes referred to as rapid prototyping and manufacturing ("RP&M") techniques. In general, rapid prototyping and manufacturing techniques build three-dimensional objects layer-by-layer from a working medium utilizing a sliced data set representing cross-sections of the object to be formed. Typically, an object representation is initially provided by a Computer Aided Design (CAD) system.

Stereolithography, presently the most common RP&M technique, was the first commercially successful solid imaging technique to create three-dimensional objects from CAD data. Stereolithography may be defined as a technique for the automated fabrication of three-dimensional objects from a fluid-like photopolymer build material utilizing selective exposure of layers of the material at a working surface to solidify and adhere successive layers of the object (i.e. laminae). In stereolithography, data representing the three-dimensional object is input as, or converted into, two-dimensional layer data representing cross-sections of the object. Layers of photopolymer build material are successively formed and selectively transformed or solidified (i.e. cured) using a computer controlled laser beam of ultraviolet (UV) radiation into successive laminae according to the two-dimensional layer data. During transformation, the successive laminae are bonded to previously formed laminae to allow integral formation of the three-dimensional object. This is an additive process. More recently, stereolithographic designs have employed digital light-processing technology wherein visible light initiates the polymerization reaction to cure the photopolymer build material (i.e. also referred to as resin).

Stereolithography represents an unprecedented way to quickly make complex or simple parts without tooling. Since this technology depends on using a computer to generate its cross-sectional patterns, there is a natural data link to CAD/CAM. Such systems have encountered and had to overcome difficulties relating to shrinkage, curl and other distortions, as well as resolution, accuracy, and difficulties in producing certain object shapes. While stereolithography has shown itself to be an effective technique for forming three-dimensional objects, other solid imaging technologies have been developed over time to address the difficulties inherent in stereolithography and to provide other RP&M advantages.

These alternate technologies, along with stereolithography, have collectively been referred to as solid freeform fabrication or solid imaging techniques. They include laminated object manufacturing (LOM), laser sintering, fused deposition modeling (FDM), and various ink jet based systems to deliver either a liquid binder to a powder material or a build material that solidifies by temperature change or photocuring. Each of these additive technologies have brought various improvements in one or more of accuracy, building speed, material properties, reduced cost, and appearance of the build object.

During the same time period that solid imaging or solid freeform fabrication has evolved, the two-dimensional imaging industry evolved ways to displace the projected image on a screen or, in the case of the printing industry, on a receiving substrate. These approaches addressed the basic problem that digital light projectors produce images with coarse resolution. Digital light projectors typically project only 100 pixels per inch for an image size of 10.24 inches by 7.68 inches, so their resolution is limited by the pixel sizes. The photographic printing industry especially has employed techniques to shift two-dimensional images to improve resolution by a variety of techniques, including moving the light source or light valve. Other approaches have included moving or shifting the photographic paper, using polarizing and double refracting plates, and, in the case of image projection systems, using multiple spatial light modulators. All of these systems have addressed the inherent limitation of image distortion when projecting resized digital images or the problem of light valve projectors, such as a liquid crystal display (LCD) or a digital micro-mirror device (DMD), having a fixed number of pixels. Attempting to utilize image displacement techniques with digital image projections in solid imaging applications presents unique problems because of the three-dimensional aspect of the object being created. The problems of two-dimensional digital image projection, when applied to three-dimensional solid imaging, cause inaccurate feature placement, potential loss of feature details, and smoothness of curves or edges on objects being built to be roughened or uneven and poorly defined. Most recently, techniques have been developed using pixel shifting to address this problem. However, those approaches suffer from the deficiencies of requiring multiple exposures of individual pixels, thereby inherently slowing the process, and requiring mechanical hardware to accomplish the pixel shifting. Additionally, when using multiple exposures with techniques such as pixel shifting, there are alignment issues that must be addressed to ensure the exposures are properly positioned to obtain maximum resolution and the desired edge smoothness.

Lastly, none of the prior solid freeform fabrication approaches, while making substantial improvements, achieve a truly low cost system that produces highly accurate and visually appealing three-dimensional objects in a short build time.

These problems are solved in the design of the present invention by combining a new solid imaging technique with the use of digital imaging projection in a manner that provides accurate object features while achieving high resolution and object wall smoothness in three-dimensional object fabrication while being relatively low cost and not requiring additional hardware.

SUMMARY OF THE INVENTION

It is an aspect of the present invention that an apparatus and method are provided that achieve improved wall smoothness, feature accuracy and resolution imaging in three-dimensional objects built using UV or visible light and a solidifiable photopolymer build material.

It is another aspect of the present invention that either gray scale exposure level for each projected pixel in a cross-section or illumination time of each pixel within the image area or both is used to vary the level of light energy during the exposure of each image cross-section projected onto a solidifiable photopolymer build material in order to control the polymerization boundary of the solidifiable photopolymer build material so that smooth edges and fine feature retention in the projected pixel image via edge or wall placement is obtained as the three-dimensional object is being built.

It is still another feature of the present invention that an out of focus characteristic of a projected image is utilized with exposure levels varied with gray scale or illumination time of each pixel within the image area or both in order to better control the polymerization boundary of the solidifiable photopolymer build material that is exposed.

It is even another feature of the present invention that software is used to characterize the light intensity versus gray scale levels across the image projected by the digital light projector onto the solidifiable photopolymer build material in order to optimize the image projection of a three-dimensional object to be built.

It is still another feature of the present invention that the width of light distribution for each pixel can be controlled by the degree of focus of a digital light projector.

It is yet another feature of the present invention that the exposure levels for a radiation source such as digital light projector can be characterized (i.e. controlled and finely adjusted) either (1) by varying the gray scale levels of the radiation source or (2) by controlling the illumination time of different pixels differently or (3) by varying the degree of focus to control the width of light distribution or each pixel illumination or (4) by varying the light intensity versus age of the radiation source (e.g. projector lamp), or (5) by combinations thereof, so as to vary the energy level in the projected pixels so that the polymerization boundary of the solidifiable photopolymer build material is controlled by providing sufficient light energy with respect to the critical energy $E_c$ to initiate photopolymerization.

It is an advantage of the present invention that a low cost solid imaging device is obtained that provides smooth object edges in the projected image along with accurate features and good resolution without the need for additional mechanical hardware.

It is another advantage of the present invention that accurate feature placement in each cross-section in a three-dimensional object being built layer-by-layer is obtained so that accurate feature placement is not lost due to the fixed number of pixels that can be projected in a single image projection by a digital light projector.

It is still another advantage of the present invention that a digital light projector can be characterized for light intensity width in both the X and Y directions as a function of the pixel location to achieve smooth image edges and less image granularity with enhanced image resolution.

These and other aspects, features, and advantages are obtained by the present invention through the use of a solid imaging apparatus and method that employ gray scale exposure levels for the boundary pixels in an image area of a cross-section and software that determines the gray scale exposure levels for the boundary pixels across the image projected by a digital light projector onto a solidifiable photopolymer build material in order to optimize the projected image by a projector that is characterized for light intensity width and light intensity versus gray scale controlling the polymerization boundary of the solidifiable photopolymer build material in the boundary pixels forming an object edge or wall to enable a three-dimensional object to be built with no lost features or uneven or rough edges, while retaining high resolution.

BRIEF DESCRIPTION OF THE DRAWINGS

These and other aspects, features and advantages of the invention will become apparent upon consideration of the following detailed disclosure of the invention, especially when taken in conjunction with the following drawings wherein:

FIG. 12 is a diagrammatic illustration of pixels covered by a straight line boundary of an object in an image plane showing different gray scale levels for boundary pixels, interior pixels and external pixels;

FIG. 13 is a diagrammatic illustration of pixels covered by a curved line boundary of an object in an image plane showing different gray scale levels for boundary pixels, interior pixels and external pixels;

DETAILED DESCRIPTION

Figure 1:
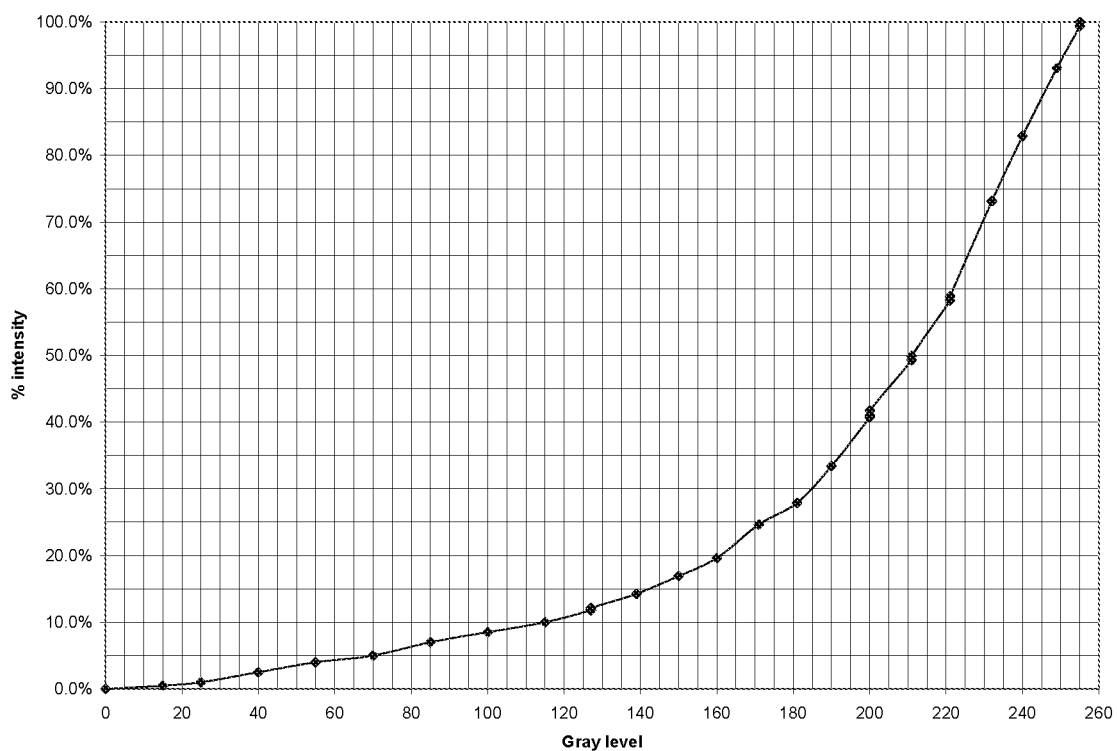
FIG. 1 is a diagrammatic illustration of the relation of light intensity and gray scale levels.

The preferred flexible transport solid imaging of the type disclosed herein involves the layer-by-layer build-up of articles from a visible or UV solidifiable photopolymer build material that is delivered by a radiation transparent flexible carrier, such as an endless belt or reciprocating or extendable and retractable sheet of transparent plastic film. The term "transparent" as used in this context means any suitable material that allows the passage of sufficient radiation (such as UV or visible light) through it to effect the photopolymerization reaction. Because these transparent materials may be very thin, the term would also include translucent or partially transparent materials. The radiation transparent flexible carrier works as a recoater that delivers fresh solidifiable photopolymer build material to the imaging area for subsequent layers that are formed after the initial layer. Solidifiable photopolymer build material is applied to the radiation transparent flexible carrier from a cartridge employing a suitable mechanism to transfer the photopolymer to the flexible transport device to provide a fresh material to create new layers as the object is built. The build material positioned on the carrier is then imaged one cross-section at a time. Each cross-section may be either imaged over the full cross-sectional image area or, more preferably, can be imaged in parts across that image area (e.g. the interior portions of the part to be built are imaged first for each cross-section and then the boundary portions of the part to be built are imaged). Each layer of photopolymer for the three-dimensional object to be built is preferably imaged by radiation projected from a digital UV projector, a digital visible light projector or a digital light projector providing both UV radiation and visible light. The projector includes a spatial light modulator, such as a digital micromirror device ("DMD") that selectively illuminates pixels for imaging. UV radiation and visible light projection is a preferred approach. These components are appropriately mounted to the frame of an apparatus of the type disclosed in U.S. patent application Ser. No. 11/416,812, assigned to the assignee of the present invention. It should be noted that the imaging steps of the present invention do not require multiple images for boundary pixels as is normally needed for pixel shifting operations.

Solid imaged parts are preferably built on an elevator platform that moves the build object or part down or up into contact with the solidifiable photopolymer build material and, after exposure, up or down out of contact with the solidifiable photopolymer build material as successive layers or laminae are formed during the building process. The build object can be built on structures known as supports rather than directly on the elevator platform. Supports are used for more complex three-dimensional objects being built that have unsupported or partially unsupported surfaces.

Commercially available digital light projectors, optionally modified to have a shorter focal length, may be employed, such as those available from InFocus Corporation of Wilsonville, Oreg. and BenQ America Corp. of Irvine, Calif. However, digital light projectors inherently have limited resolution. For example, if a 1024 by 768 pixel image is projected over a 10.24 inch by 7.68 inch area the effective resolution is 100 dpi (100 dots per inch). In this case the minimum feature size is 0.010 inch, part features may be located as far off their correct position as 0.005 inch, and a wall drawn at 45° to the X or Y axis will have a peak to peak roughness of 0.007 inch.

Commercial digital light projectors produce images with coarse resolution, as indicated above, because their resolution is limited by the pixel sizes. The 1024×768 pixels in an image generated by commercial digital light projectors limits the size of a three-dimensional object that is able to be built on a support platform because resolution decreases in proportion to an increase in build platform size. The image size in a typical commercial light projector limits resolution in the direction of the X axis to 1024 pixels and to 768 pixels in the direction of the Y axis, thereby producing the coarse image. Additionally, commercial light projectors cannot be perfectly focused so that inherent aberrations in each projector result in fuzzy pixels. This "out of focus" condition varies across a pixel image area. Further, there is a different amount of "out of focus" condition for individual projectors. However, utilizing the inherent fuzziness of pixels and employing gray scale exposure levels for each boundary pixel to vary the level of light intensity during exposure of a photocurable solidifiable build material, such as a liquid resin formulation, permits the gray scale value of a projected boundary pixel to control the polymerization boundary of the solidifiable photopolymer build material forming the object in that pixel in a single exposure to achieve much greater build object accuracy and wall smoothness of the solid image or three-dimensional part being built. Being thus able to control the polymerization boundary of the solidifiable build material corresponding to a projected boundary pixel or multiple pixels in the X and Y planes, the aforementioned 10.24 inch by 7.68 inch area would look like it had a substantially greater effective resolution than merely 100 dpi. Larger build platforms can also be utilized and larger objects can be fabricated.

A digital light projector controls a set of very small mirrors to reflect light into related pixels. By controlling the reflecting or illumination time, the light intensity K of each projected pixel in the image plane can vary from 0 (black) to 1 (white) with different gray scale levels from 0 to 255. FIG. 1 shows the relation of light intensity and the gray scale levels input for a typical projector in a pixel. A preferred range of gray scale levels is from about 60 to about 255. A more preferred range of gray scale levels is from about 100 to about 255.

Figure 2:
FIG. 2 is a diagrammatic illustration of the accumulation of light intensities at a point in an image plane.

The inherent characteristic of commercial digital light projectors that the pixels in an image are fuzzy or have slight image blurring results in the light intensity overlapping neighboring pixels. This light intensity distribution can be approximated as a Gaussian distribution for purposes of further explanation, but in actuality the light distribution can take many different forms. The light intensity K at a point (x, y) is actually the sum of the light intensity contributions of all the neighboring pixels to the point (x, y). The accumulation of these different light intensities is illustrated in FIG. 2. The present invention utilizes the fact that the light intensity at point (x,y) is the blended result of all of the light intensities of point (x, y)'s neighboring pixels. The light intensity of a pixel decreases the further it is away from the center of the pixel.

Therefore, by adjusting the optical system of a digital light projector to obtain some image blurring of the pixels, the light intensity of a pixel is spread to all of its neighboring pixels. This is seen as eight neighboring pixels for a point located in an interior pixel in the illustration shown in FIG. 2. Where the point is in a boundary pixel forming the edge or wall of an object, there will be fewer neighboring pixels, 3 neighboring pixels for a point located in a corner wall pixel and 5 neighboring pixels for a point located in an edge or wall pixel apart from a corner.

Figure 4:
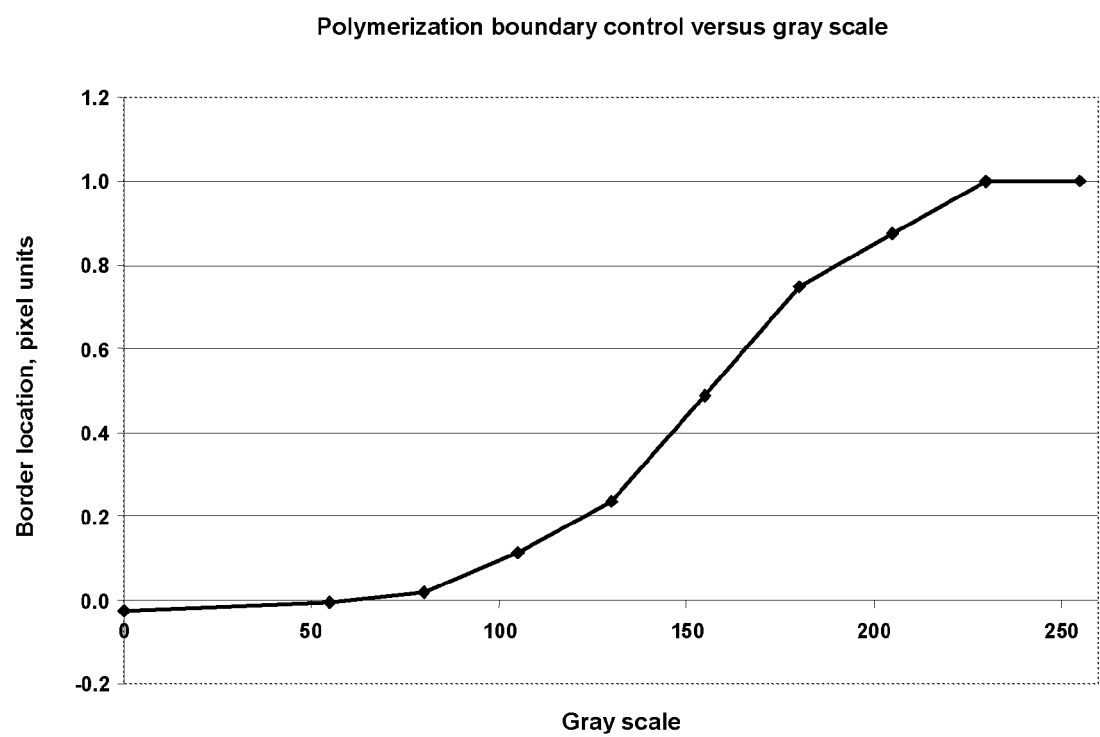
FIG. 4 is a diagrammatic illustration of the correlation between gray scale values and the border location.

FIG. 4 shows the correlation between gray scale values and the border location as the gray scale values are increased. The graph shows of the position of the boundary as the intensity of the boundary pixel goes from a gray scale value 0 to a gray scale value 255. The graph indicates a value of below zero initially because of the scatter in the data. Nevertheless, the data does show a clear 1 pixel change in border position as the intensity increases over the stated range.

The resolution of geometric features and object boundaries can be improved using the gray scale technique based upon FIG. 2. If the light intensities $K_1$, $K_2$, and $K_3$ are all 1 and $K_7$, $K_8$, and $K_9$ are all 0, then the boundaries formed by the light energy from pixels 4, 5, and 6 can be located with much higher resolution by setting light intensities $K_4$, $K_5$, and $K_6$ to different light intensities between 0 and ~1.

Controlling the exposure of an image area (also called an image plane) can be achieved by controlling certain exposure parameters. Energy delivered to a target substrate by a radiation source can be expressed by the relationship, Exposure=Intensity of the radiation×Time of exposure. This relationship is utilized in controlling exposure parameters. One parameter is controlling the illumination time of each pixel within the plane that constitutes the cross-section of a three-dimensional object being built. Alternatively, another parameter to control the level of exposure can be varying the light intensity levels, for example by varying the gray scale levels while holding the exposure time constant for all boundary pixels. A third parameter is varying the width of the light intensity of the projected pixels. This can be achieved by varying the degree of focus of the projected pixels. This parameter can vary at different locations across the image area. All three techniques can be employed separately, jointly in different combinations, or jointly all at the same time. An individual projector can be characterized for its pixel intensity width in both the X and Y planes as a function of the pixel location by measuring the projected intensity with a digital camera at selected pixels in the image area. This information can then be stored in the solid imaging apparatus to be employed to obtain optimal image performance across the image plane and accurate control of the polymerization boundary in the object being formed. A fourth additional parameter that may be controlled is the light intensity versus the age of the lamp in the projector. Since a lamp's intensity, and therefore the amount of light energy delivered, decreases with time, the aging effect of the lamp on the amount of energy delivered must be compensated for by increasing the exposure time of the lamp to have the same number of photons be delivered to the projected pixels over time. Intensity is routinely measured with a radiometer. Lastly, the calibration of these four parameters to the particular solidifiable photopolymerizable build material, especially with a resin formulation, must be done since each solidifiable photopolymer build material has its own particular characteristics, such as photospeed, that affect polymerization.

FIGS. 12 and 13 diagrammatically illustrate the use of exposures with different levels of gray scale in border pixels, interior pixels and external pixels in the image area of a 3-dimensional object being fabricated. FIG. 12 shows boundary pixels covered by a straight line boundary of an object in an image area with the levels of gray scale values being 0 outside of the object boundary, ranging from 90 to 240 along the boundary pixels and being 255 inside the object. FIG. 13 shows pixels covered by a curved line boundary of an object in an image area with the levels of gray scale values being again 0 outside of the object, ranging from 60 to 200 along the boundary pixels and again being 255 inside the object.

Figure 3:
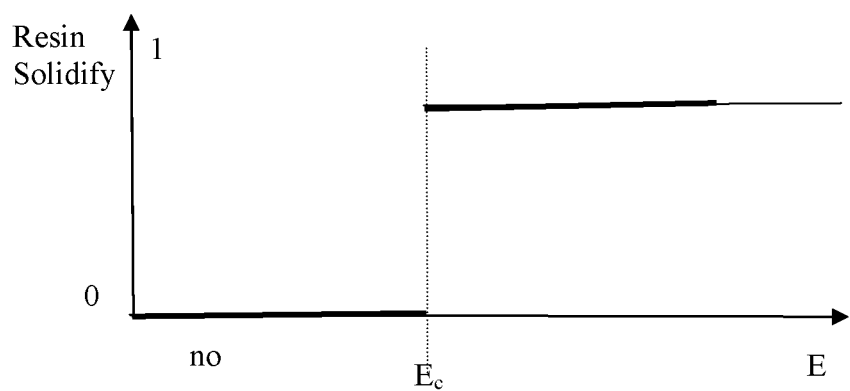
FIG. 3 is a diagrammatic illustration of the relation of light energy and photopolymer build material solidification using a resin formulation as the solidifiable photopolymer build material.

Regarding the light intensity or gray scale exposure levels that must be tuned to the particular solidifiable photopolymer build material being used, refer again to FIG. 2. This tuning is achieved by adjusting the different light intensities $K_1$-$K_9$ for the pixel at point (x, y) and its eight neighboring pixels so that the desired accumulated light intensity K is sufficient to solidify the solidifiable photopolymer build material at that point based on the time of illumination of each pixel in the image area forming an object cross-section. When the accumulated light intensity K equals or exceeds the critical energy $E_c$ needed to solidify the solidifiable photopolymer build material, such as a liquid resin formulation, that build material will solidify and add to the geometry of the object being formed. Where the accumulated light intensity is less than the critical energy $E_c$, the build material will remain in the non-solidified or liquid state. This relationship is illustrated in FIG. 3 where the solidifiable photopolymer build material is a resin formulation.

For a typical resin the critical energy $E_c$ is much less that the energy used to expose the layer, perhaps 20% or less. The $E_c$ for typical resins employed in apparatus of the present inventor is preferably about 10% to 12% of the layer exposure energy employed. Looking at FIG. 5, assuming $E_c$ is represented by the intensity level of 0.2, the width of the region that is solidified varies according to the light intensity of the edge pixel. Since the light intensity from a pixel varies with gray scale, the polymerization of the solidifiable build material forming the edge or border of a region can be controlled by varying the gray scale of the border pixels, as shown in FIG. 5.

In one application of the present invention, the solidifiable photopolymer build material or resin formulation is delivered to the imaging area via a radiation transparent flexible carrier, such as a polypropylene or a polycarbonate film. The photopolymer is applied in a thin layer to the flexible transport film, which can be in the form of an endless belt, a reciprocating film sheet or a retractable and extendible film sheet.

A digital light projector is the radiation or light source that projects an image via a plurality of small movable mirrors with selected pixels for illumination onto an image plane in the exposure of a cross-section of a three-dimensional object being formed on a support platform. The support platform is raised and lowered to bring the cross-sectional layers being formed into contact with the layer of build material that is deposited on flexible transport film from a solidifiable photopolymer build material cartridge. The build can be right side up with the object being built on top of the support platform or upside down, being suspended downwardly from the support platform. The cartridge includes or is in fluid flow communication with a build material supply reservoir of solidifiable photopolymer build material, such as a liquid resin formulation, that is applied to the flexible transport film. A transparent backing plate also can be employed. The exposure of the image cross-section by illuminating selected pixels creates a solidified portion of the cross-section of the three-dimensional object being formed.

Figure 5:
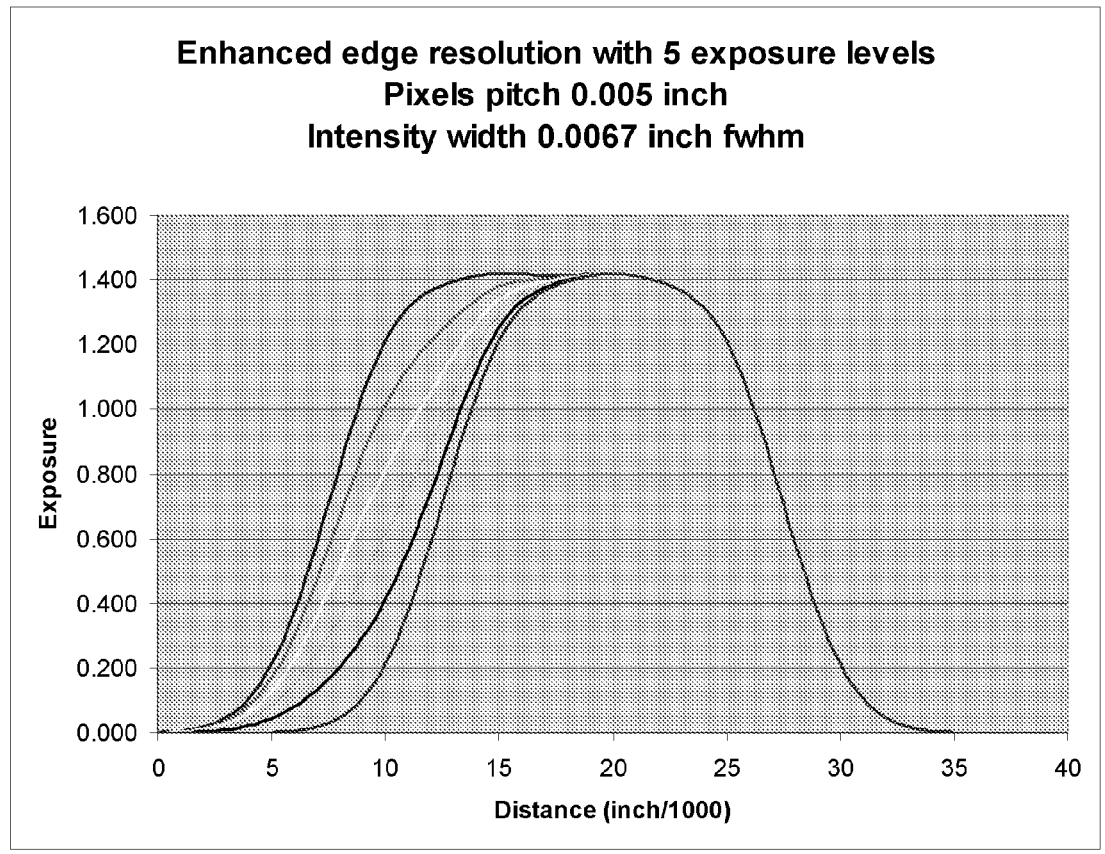
FIG. 5 is a graphical illustration of 4 adjacent pixels modeled with a Gaussian distribution where the exposure intensity of the first pixel is varied to 5 different levels illustrating the control of the polymerization boundary of the photopolymer build material (resin) in a projected border pixel as the gray scale levels increase or decrease.
Figure 6:
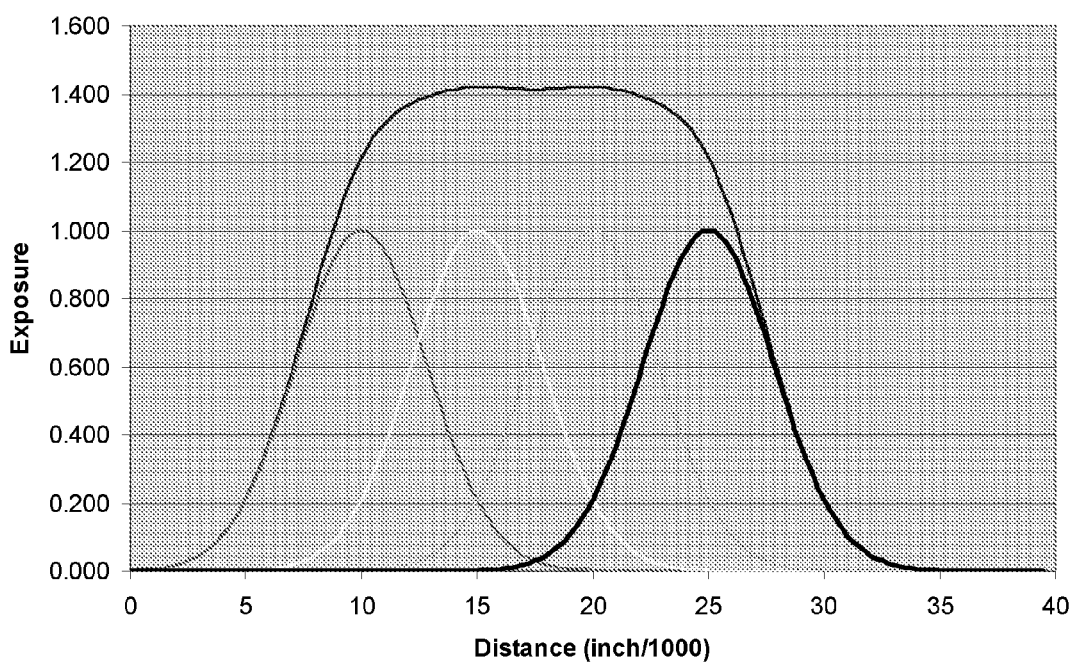
FIG. 6 is a graphical illustration showing the exposure intensities of the 4 adjacent pixels modeled with a Gaussian distribution for an exposure level of 1.0 and having a full width of half maximum (fwhm) of 6.7 mils (0.0067 inch) and 5 mils (0.005 inch) peak to peak separation.
Figure 7:
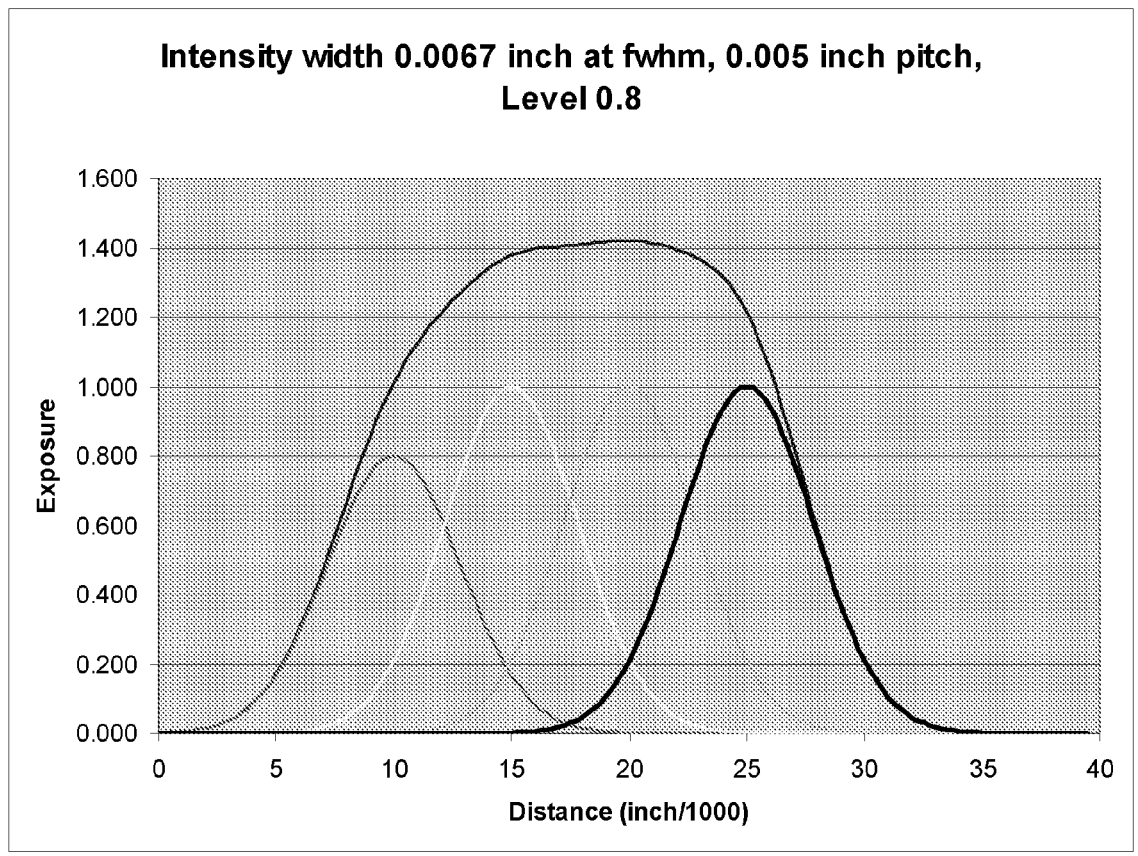
FIG. 7 is a graphical illustration showing the exposure intensities of the 4 adjacent pixels modeled with a Gaussian distribution for an exposure level of 0.8 for the boundary pixel and having a full width at half maximum (fwhm) of 6.7 mils (0.0067 inch) and a 5 mil (0.005 inch) peak to peak separation.
Figure 8:
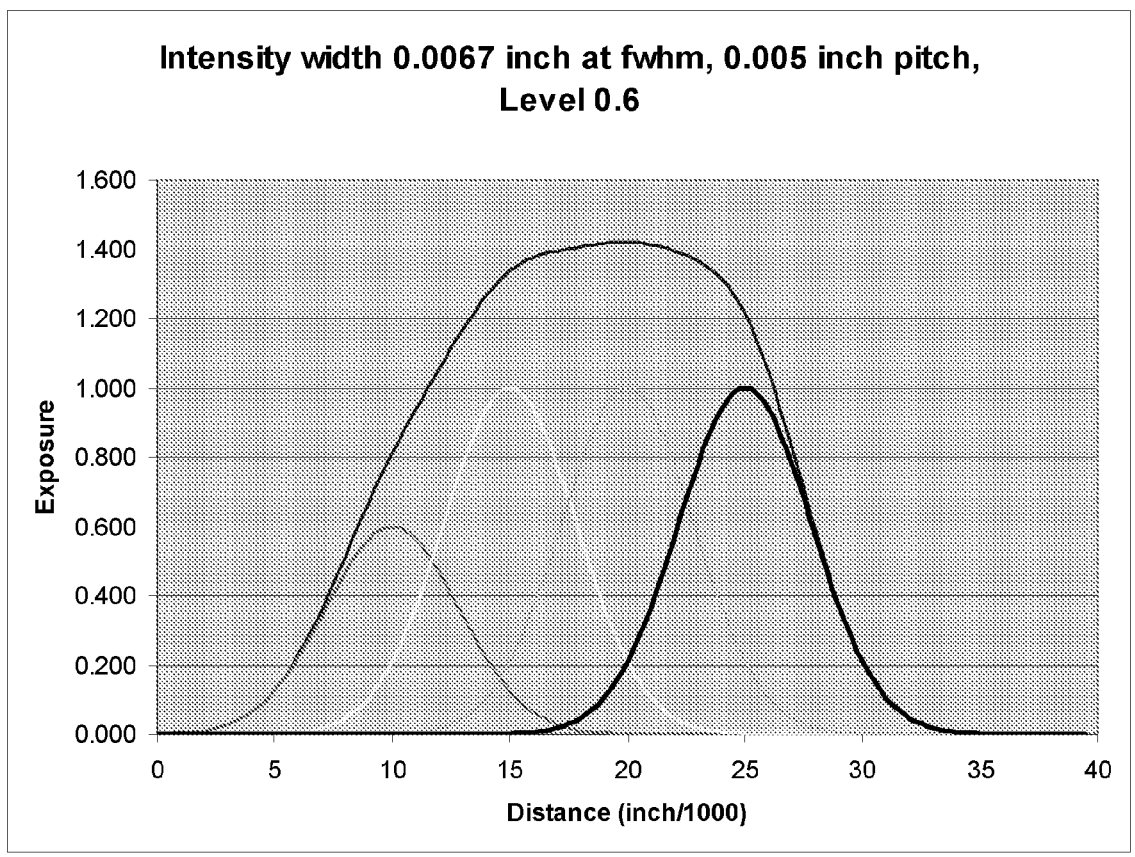
FIG. 8 is a graphical illustration showing the exposure intensities of the 4 adjacent pixels modeled with a Gaussian distribution for an exposure level of 0.6 for the boundary pixel and having a full width at half maximum (fwhm) of 6.7 mils (0.0067 inch) and a 5 mils (0.005) inch peak to peak separation.
Figure 9:
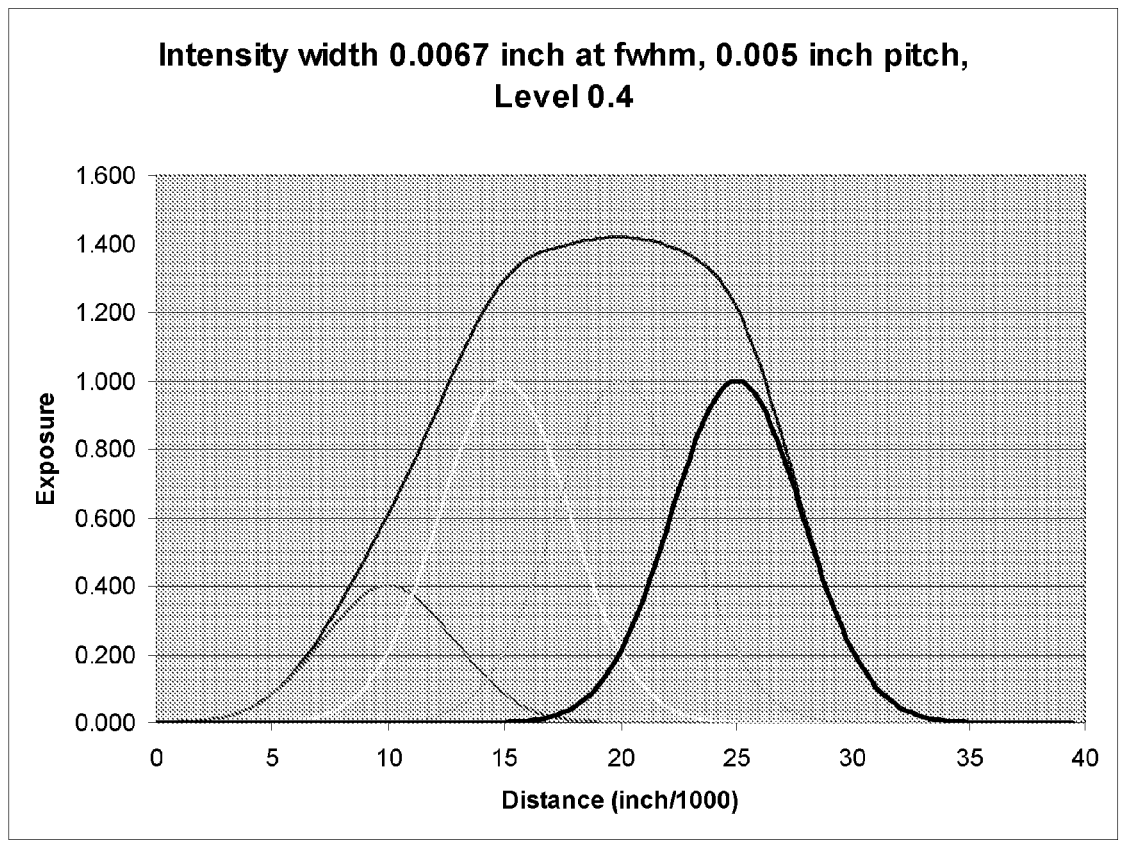
FIG. 9 is a graphical illustration showing the exposure intensities of the 4 adjacent pixels modeled with a Gaussian distribution for an exposure level of 0.4 for the boundary pixel and having a full width at half maximum (fwhm) of 6.7 mils (0.0067 inch) and a 5 mils (0.005) inch peak to peak separation.
Figure 10:
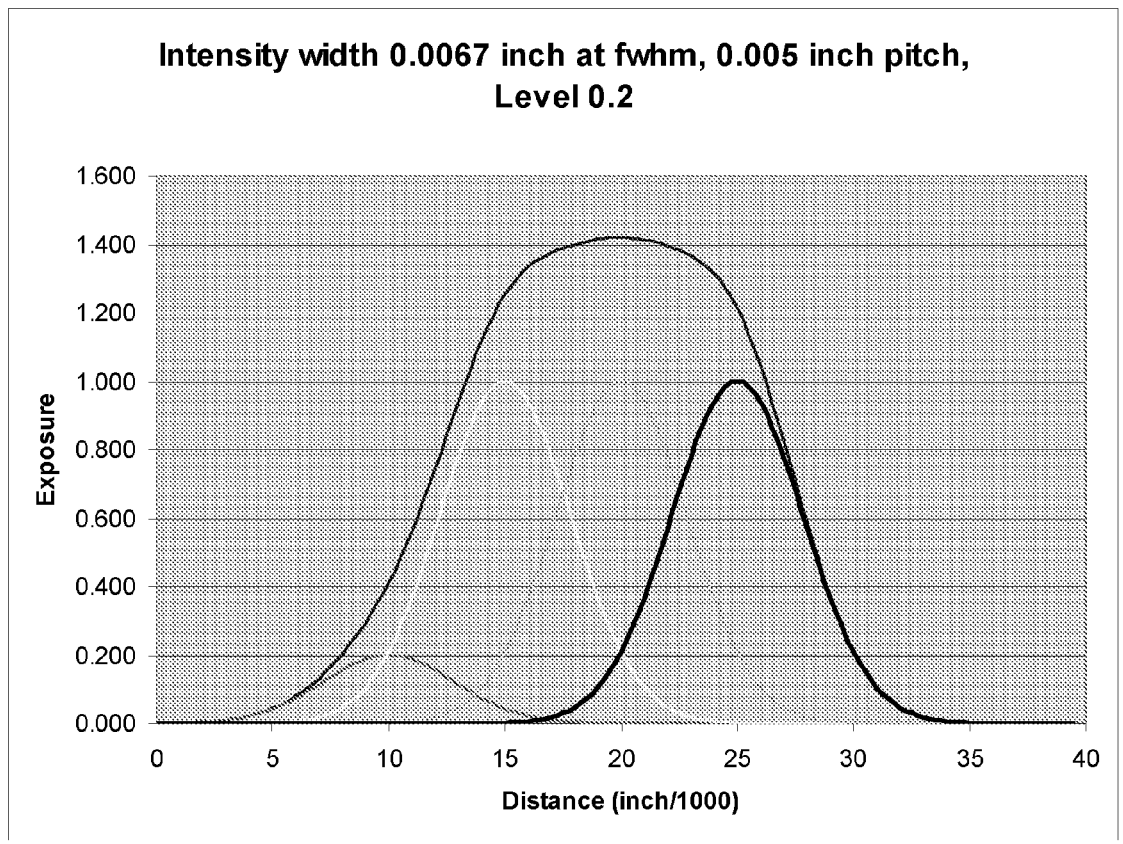
FIG. 10 is a graphical illustration showing the exposure intensities of the 4 adjacent pixels modeled with a Gaussian distribution for an exposure level of 0.2 for the boundary pixel and having a full width at half maximum (fwhm) of 6.7 mils (0.0067 inch) and a 5 mils (0.005) inch peak to peak separation.
Figure 11:
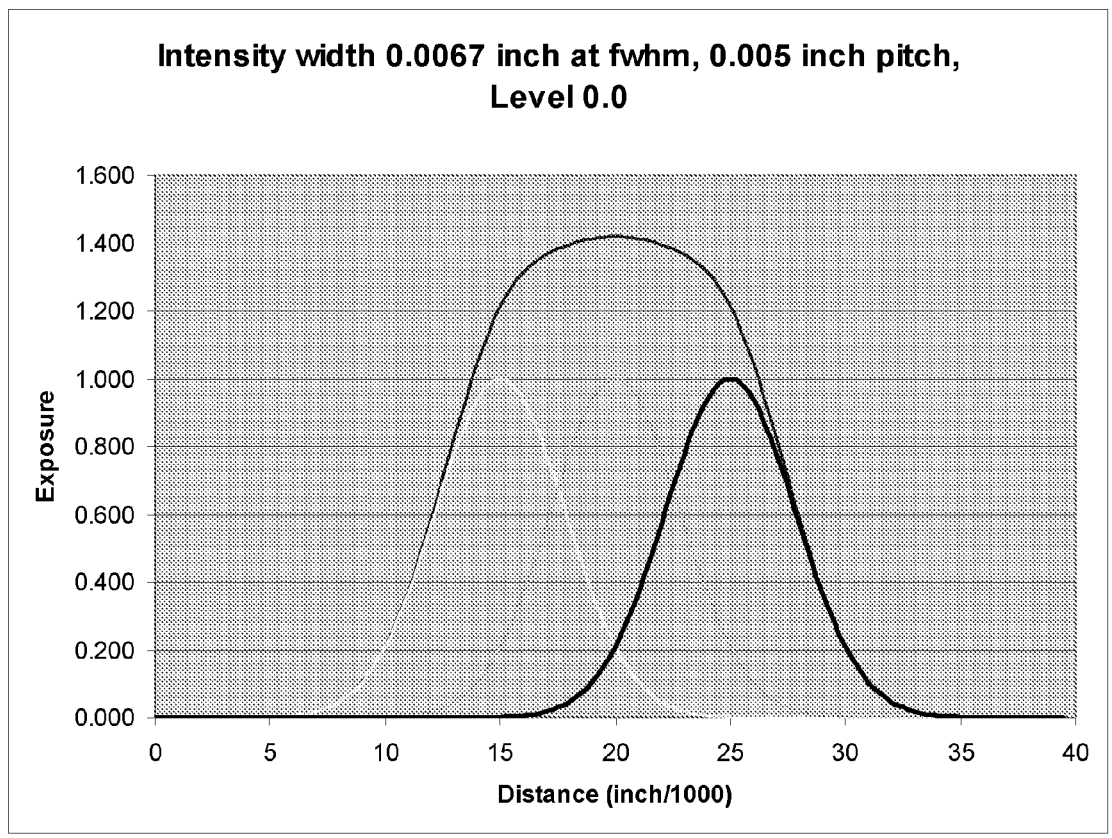
FIG. 11 is a graphical illustration showing the exposure intensities of the 4 adjacent pixels modeled with a Gaussian distribution for an exposure level of 0.0 and having a full width at half maximum (fwhm) of 6.7 mils (0.0067 inch) and a 5 mils (0.005) inch peak to peak separation.

Looking now at FIG. 5, there is shown in a graphical illustration the amount of polymerization boundary control obtainable in a projected boundary pixel by combining the use of varying exposure intensity levels and pixel intensity width or the degree of projected pixel focus. This creates slight image blurring and affects the amount of light energy delivered to boundary pixels to control the polymerization boundary of the solidifiable photopolymer build material to thereby define the effective location of the edge or boundary of a feature in a boundary pixel of an object with sub-pixel resolution. Varying the intensity exposure levels is achieved by varying the illumination or exposure time and/or the gray scale exposure levels. This technique achieves much higher image boundary resolution than is present in just the pixel resolution. FIG. 5 shows 4 adjacent pixels for which the exposure intensity of the first pixel has been varied to 5 different levels with the pixels having a full width at half maximum (fwhm) of 6.7 mils (0.0067 inch) and 5 mils (0.005 inch) peak to peak separation. Approximately 1 mil (0.001 inch) resolution is achieved at this spacing.

FIGS. 6-11 show the 4 adjacent pixels with exposure intensities varying from 1.0 to 0.0 in 5 equal exposure intensity decrements, as well as the sum or blended result of the accumulation of the light intensities in each case. In each FIG. 6-11, the pixels have a full width at half maximum (fwhm) of 6.7 mils (0.0067 inch), which is the width of the Gaussian light distribution, and a 5 mils (0.005 inch) peak to peak separation. FIGS. 6-11 all have the pixels light intensity modeled with a Gaussian distribution.

Figure 14:
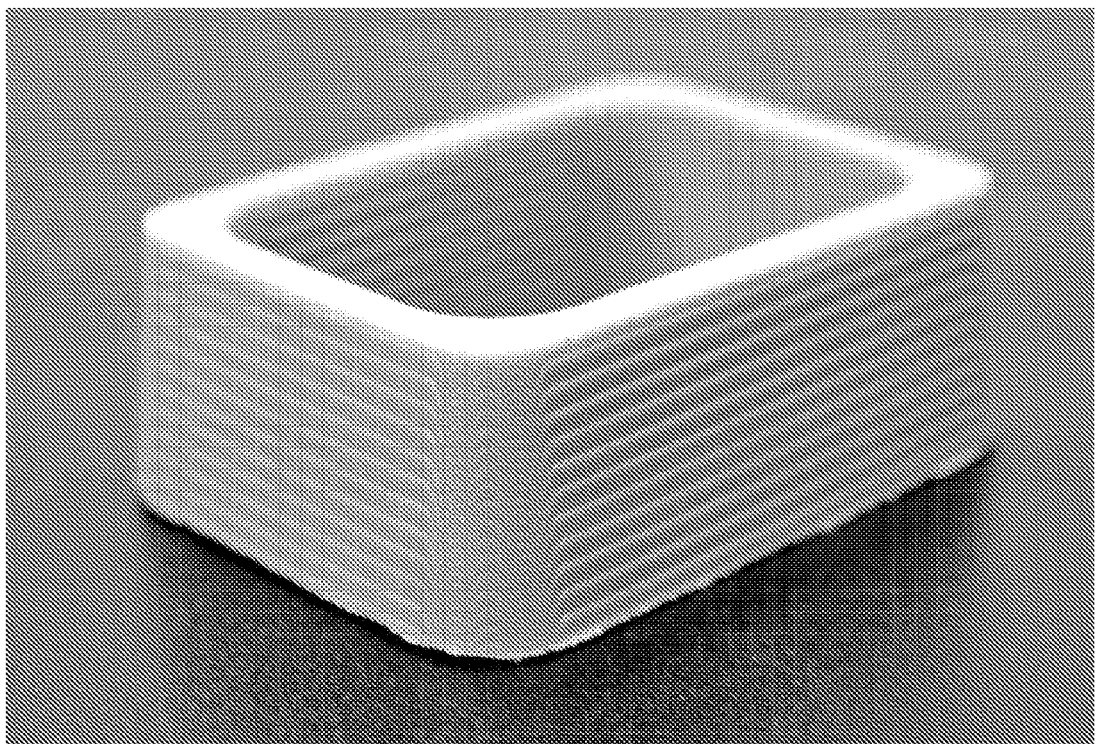
FIG. 14 is a photograph of a three-dimensional object fabricated by an apparatus employing an imaging process employing levels of exposure without gray scale levels showing rough edge walls.
Figure 15:
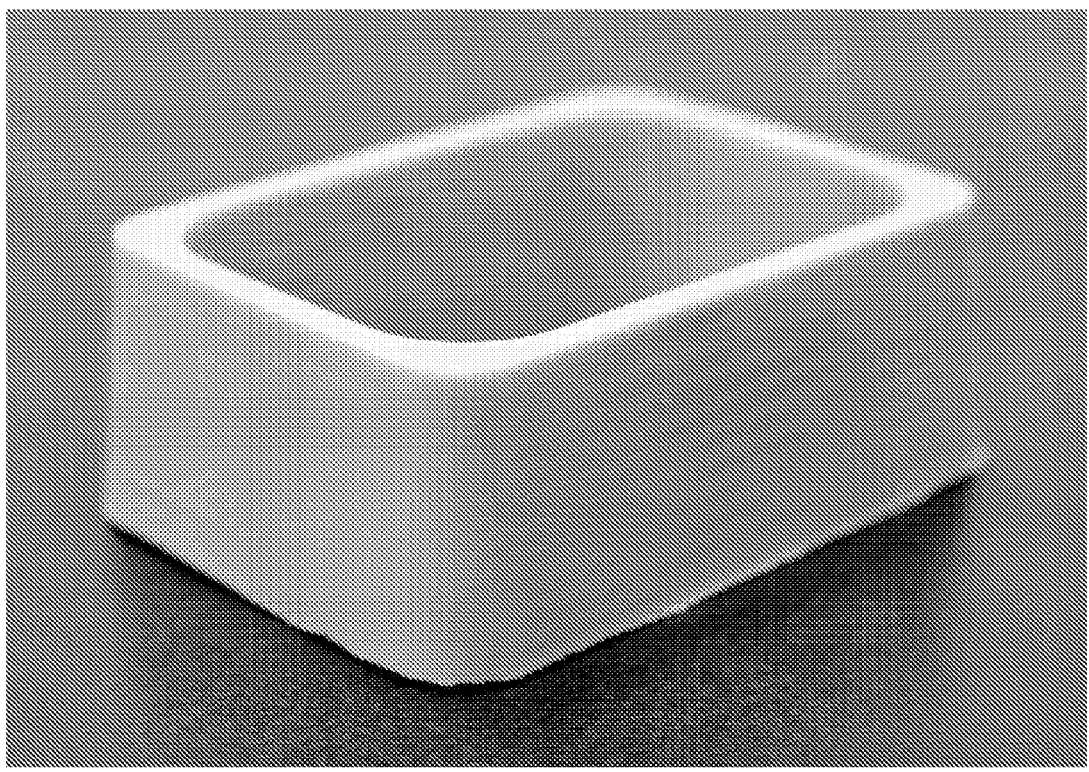
FIG. 15 is a photograph of a three-dimensional object fabricated by an apparatus employing an imaging process employing levels of exposure with using gray scale levels showing smooth edge walls.

Therefore, from FIGS. 5-11 and the preceding discussion it can be seen that it is desired and possible to improve the resolution of the boundaries of an object and features in an object by using different gray scale values in boundary pixels. FIGS. 14 and 15 show the difference in the edge walls of a three-dimensional object fabricated using apparatus employing a flexible transport solid imaging system and process. FIG. 14 shows the rough edge walls of the near vertical walls of an object fabricated with exposure levels not employing gray scale. FIG. 15 shows the improved geometry and smoother edge walls of the same three-dimensional object fabricated with the same apparatus using the same flexible transport solid imaging system and process, but employing exposure levels with different levels of gray scale.

It should be noted that a projected image is a two-dimensional image with edges in the X and Y directions. When a three-dimensional object is fabricated by layering multiple cross-sectional layers, the fabricated object extends in the Z direction or the third dimension. The present invention achieves edge smoothness in the projected image in individual two-dimensional cross-sectional image projections. When each individual two-dimensional cross-sectional image projection polymerizes the solidifiable photopolymer build material, a solid layer is formed corresponding to the exposed projected pixel areas on the solidifiable photopolymer build material. Adhering or summing superimposed multiple cross-sectional layers one to another in a build process, the present invention forms a three-dimensional object with smooth walls that are formed from the plurality of adhered smooth edges in the individual cross-sectional layers.

In operation, digital data for the three dimensional object to be built is sent to the solid imaging system. This is preferably from a CAD station (not shown) that converts the CAD data to a suitable digital layer data format and feeds it to a computer control system or host computer (also not shown) where the object data is manipulated to optimize the data via an algorithm to provide on/off instructions for the digital light projector. Alternatively, this digital data can be received by the solid imaging systems by digitizing a physical part or from pattern files. The solid imaging layer data attained by the CAD data or by digitizing a physical part or sometimes from pattern fills is preferably processed by the host computer utilizing a slicing program to create cross-sectional data representative of the cross-sectional layers of the object to be built. The solid imaging layer data obtained from pattern data is sometimes not sliced, but patterns are directly utilized as bit-map cross-sections. These steps of the present invention are conducted in the same fashion as in standard stereolithography processes. The slice data obtained from the slicing program is converted into bit map data. Using a gray scale software program, the host computer calculates the gray scale exposure levels required to control the polymerization boundary of the solidifiable photopolymer build material when the build material is exposed. A microprocessor controller or computer in the solid imaging apparatus receives the bit map input of the object to be formed. An algorithm is then applied to the bit mapped cross-sectional data by the controller or computer in the solid imaging apparatus to create the instructions for a controller, such as a microchip, in the digital light projector. The digital light projector has previously been characterized for its focus of the projected light pixels by observing the degree of focus of pixels across the image area (or plane). The projector has also been characterized for its light intensity distribution by the use of a radiometer to record light intensity at selected pixel locations on the image area and the focus and illumination time have been adjusted as needed. The illumination time is adjusted based on the light intensity, age of the lamp in the digital light projector, and the particular solidifiable photopolymer build material to be utilized. A radiation transparent build material carrier delivers the solidifiable photopolymer build material from a supply reservoir or cartridge to the imaging area. The imaging area is supported by the support platform that is movably mounted to the frame of the solid imaging apparatus to extend and retract the support platform on which the solidifiable photopolymer build material is polymerized and formed into a three-dimensional object. The digital light projector illuminates selected pixels in the desired illumination pattern at desired exposure levels in the image area within the boundary of the three-dimensional object by projecting an image representative of the bit mapped cross-sectional data in the cross-section being formed. The desired exposure levels are obtained by having characterized the digital light projector for one or more of the previously discussed exposure parameters and adjusted the exposure levels as needed in response to the characterization. The desired exposure levels from the digital light projector in the image area permit the projected image to selectively solidify the photopolymer build material and control the polymerization boundary of the photopolymer build material in the projected pixilated image through the application of different exposure parameters to different areas of the image plane. The support platform is then moved out of contact with the radiation transparent build material carrier to prepare for the receipt of fresh or uncured solidifiable photopolymer build material prior to the next exposure. The steps of delivering the solidifiable photopolymer build material, illuminating the image area on the support platform and repositioning the support platform to receive a fresh supply of solidifiable photopolymer build material is repeated for each cross-sectional layer until the three-dimensional object is completed.

The algorithm, based on experiential data, selects pixels for a higher gray scale value exposure or illumination that have a larger portion of the object's feature within a particular pixel. Although the amount of photopolymer build material solidified at a boundary will vary for different types of build materials and different digital light projectors, the relationship between the gray scale level and amount of photopolymer build material solidified along a boundary pixel will generally follow the same pattern. The gray scale value K of a pixel is set according to the area of the pixel that is inside the part or feature. The gray scale value K assigned to a pixel is a function of the ratio r [K=f(r)], where r is the area A' of the portion of a pixel that is inside the part or feature to the total area A of the pixel or r=A'/A. However, a gray scale value is needed for boundary pixels and their neighboring pixels since the ratio is 1 for pixels inside the part or feature and 0 for pixels outside. The value of the area of the portion of a boundary pixel that is inside the part or feature is based on super-sampling and approximates the value of the area A' of the portion of a pixel that is inside the part or feature. This super-sampling approach is suitable for use with an image-based slicing algorithm.

The algorithm divides a boundary pixel, through which some portion of the object's feature passes, into a set of sub-pixels $P_{ij}$ in a k×k matrix or subdivision of the sub-pixels $P_{ij}$. The algorithm then samples each of the sub-pixels $P_{ij}$ at its center to determine if it is covered by some portion of the object's feature. The total area of those sub-pixels $P_{ij}$ covered by or within some portion of the object's features approximates the area A' of the portion of the divided pixel that is inside the object's feature. For a pixel having k×k subdivisions, the ratio r can be expressed as the sum of the total area of the sub-pixels $P_{ij}$ covered by or within some portion of the object's features divided by k×k subdivisions, or $$r = \frac{\sum P_{ij} \text{ (covered)}}{k \times k}.$$

Using this approach, the boundary resolution of an object built is determined by the number of subdivisions described above forming the k×k matrix or subdivision. For example, a 4×4 matrix will have 16 different gray scale values and the boundary resolution determined by Pixel Size/4. Similarly, for an 8×8 matrix there will be 64 different gray scale values and the boundary resolution determined by Pixel Size/8.

An alternative algorithmic approach to the super-sampling technique just discussed for instructing which pixels for the projector to illuminate can be based on boundary area calculations. The area calculations within the boundaries of the projected object or feature within each pixel use the actual or closely approximated boundary segments to create distinct geometric shapes within the boundaries of each pixel. The algorithm will calculate the exact or approximate areas of each geometric shape to be illuminated within the boundary segment or segments passing through each pixel and sum the areas to generate an exact or nearly exact area within the boundary segment or segments of the object or feature being projected in each cross-section of the object.

There still may be visible systematic boundary errors in the form of observable patterns on object boundaries of objects fabricated using the described gray scale exposure levels. Admittedly, these errors will be 1/k times smaller and less visible by using different gray scale exposure levels for the boundary pixels, but they may still be observable upon close inspection. Introducing randomization into the gray scale values at the boundary pixels can produce a fabricated object that does not have any observable patterns on its boundaries. This can be accomplished by adding a random number Δf within a given range and assigning f(r)+Δf as the pixel's gray scale value or by using a look-up table in which for any given area ratio r, the return value f(r) from the look-up table varies within a given range.

As previously stated, an ultraviolet ("UV") digital radiation projector or a visible digital light projector or a digital light projector system using both UV radiation and visible light may be used to cure the solidifiable photopolymer build material. Any suitable flowable or spreadable medium capable of solidification in response to the application of an appropriate form of energy stimulation may be employed in the practice of the present invention, for example liquids, gels, pastes, or semi-liquid materials (e.g. mixtures of liquid materials with solid materials suspended therein), and combinations thereof. Many liquid state chemicals are known which can be induced to change to solid state polymer plastic by irradiation with UV radiation or visible light. A suitable curable photopolymer that may be employed as the solidifiable photopolymer build material in the practice of the present invention is Acrylate-24 shown in Table I below. This formulation exhibited excellent resolution and photospeed when utilized with a BenQ PB7220 projector. The parts created displayed outstanding green strength with balanced stiffness and toughness.

TABLE 1

| Acrylate-24 | Units of Weight | Weight Percent (%) |
| --- | --- | --- |
| PRO 6817 (from Sartomer Company) | 4.8 | 23.02 |
| SR 833S (from Sartomer Company) | 3.5 | 16.79 |
| Ebecryl 83 (from UCB Chemicals Corp.) | 2.4 | 11.51 |
| PRO 6169 (from Sartomer Company) | 5.2 | 24.94 |
| SR 531 (from Sartomer Company) | 3.6 | 17.27 |
| Irgacure I-907 (From Ciba Specialty Chemicals, Inc.) | 0.75 | 3.60 |
| Irgacure I-819 (From Ciba Specialty Chemicals, Inc.) | 0.6 | 2.88 |
| Total | 20.85 | 100.00 |

Additives can be incorporated into the formulation to promote release ability from the transparent transport means, such as silicone acrylate materials.

It should also be noted that the present invention also can be employed to fabricate features in an object, such as a holes, which are smaller than a projector's pixel size. This is accomplished by adjusting the exposures of the neighboring pixels so that the critical energy $E_c$ necessary to photopolymerize the particular photopolymer being used is less than $E_c$ for the area within a hole and greater than $E_c$ for area outside the hole. Using this technique of controlling the gray scale values of the neighboring pixels and that of the pixel containing the hole, a projector with a resolution, for example, of 0.008 of an inch can generate a hole with a diameter, for example, of 0.004 of an inch since only the photopolymer outside the hole will be solidified while the photopolymer within the hole will remain liquid.

While the invention has been described above with references to specific embodiments thereof, it is apparent that many changes, modifications and variations in the materials, arrangements of parts and steps can be made without departing from the inventive concept disclosed herein. For example, the image exposure parameters control technique could equally well be employed in a modified stereolithography apparatus having a vat containing the working surface onto which an image is projected, but employing a UV radiation, visible light, or combination UV radiation and visible light digital image projector in place of a laser. An example of such a stereolithography apparatus that could easily be modified is a Viper si2™ SLA® system available commercially from 3D Systems, Inc., the assignee of the present invention. The image projector employs a controller device and software to control exposure parameters as described herein to control the positioning of the polymerization boundary in the boundary pixels in the image of a projected cross-section of a three-dimensional object being formed from a solidifiable liquid medium. The liquid medium forms a fresh layer to be solidified either by a deep dip technique or by use of a recoater that places a fresh layer of liquid material onto an already exposed and solidified cross-section of the three-dimensional object being formed, as described in U.S. Pat. Nos. 5,902,537 and 6,048,487 both assigned to the assignee to the present invention. Accordingly, the spirit and broad scope of the appended claims are intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A method for forming a three-dimensional object layer-by-layer comprising the steps of:
   a. forming bit-map data of cross-sectional layers of a three-dimensional object to be built;
   b. delivering a solidifiable photopolymer build material to an imaging area, wherein the solidifiable photopolymer build material is solidified when exposed to an accumulated light intensity equal or exceeding a critical energy needed to solidify the solidifiable photopolymer build material;
   c. projecting an image representative of the bit-map data of a single cross-sectional layer from a digital radiation source onto the solidifiable photopolymer build material in the imaging area to illuminate pixels in the image area to selectively solidify the photopolymer build material;
   d. controlling with sub-pixel resolution the boundary polymerization of the build material by providing a desired accumulated light intensity equal or exceeding the critical energy at a point within a pixel by setting light intensities of neighboring pixels, wherein setting light intensities of neighboring pixels comprises summing the neighboring pixel's light intensity contributions to the point; and
   e. repeating steps b, c and d multiple times until a plurality of object cross-sections are formed to obtain an object with at least one boundary defining sub-pixel resolution.

2. The process of claim 1 wherein said bit-map data is formed by (i) receiving digital data of the three-dimensional object to be built; (ii) processing the three-dimensional digital data to form slice data representative of cross-sectional layers of the object; and (iii) converting the slice data into bit-map data.

3. The method according to claim 2 wherein step (d) is carried out by varying the gray scales of boundary pixels of the digital radiation source while holding the exposure time constant for all boundary pixels.

4. The method according to claim 1 wherein step (a) comprises receiving three-dimensional CAD data of the three-dimensional object to be built.

5. The method according to claim 1 wherein step (a) comprises digitizing a physical article.

6. The method according to claim 1 wherein at least one step (d) is carried out by the combination of controlling the exposure in an image area by the combination of focusing the digital radiation source to control a width of light distribution for each pixel illumination, controlling the level of gray scale exposure by the digital radiation source, and controlling the time of illumination of pixels by the digital radiation source.

7. The method according to claim 1 wherein the digital radiation source being selected from the group consisting of a UV radiation source, a visible light source and a combination thereof.

8. The method according to claim 7 wherein the digital radiation source being a digital light projector.

9. The method according to claim 1 wherein said comprising using a solidifiable photopolymer build material is selected from the group consisting of a solidifiable photopolymer liquid resin formulation, a solidifiable photopolymer paste, a solidifiable photopolymer gel, a solidifiable photopolymer semi-liquid and combinations thereof.

10. The method of claim 1 wherein randomization is introduced into gray scale values at boundary pixels.

11. The method according to claim 1 wherein the setting the light intensities of neighboring pixels comprises setting the light intensities of eight neighboring pixels.

12. A method for forming a three-dimensional object layer-by-layer comprising the steps of:
   a. forming bit-map data of cross-sectional layers of a three-dimensional object to be built;
   b. characterizing a digital light projector for its focus of pixels in an image area to control the width of light distribution of each pixel illumination of the object to be formed;
   c. characterizing the digital light projector for light intensity distribution versus gray scale levels in pixels in the image area and for illumination time of each pixel within the image area to control the amount of light energy delivered during an exposure to each pixel in the image area;
   d. delivering a solidifiable photopolymer build material to an imaging area, wherein the solidifiable photopolymer build material is solidified when exposed to an accumulated light intensity equal or exceeding a critical energy needed to solidify the solidifiable photopolymer build material;
   e. projecting an image representative of cross-sectional image data from the digital light projector to illuminate pixels in an illumination pattern on an image plane exposure to selectively solidify the liquid medium and control with sub-pixel resolution the polymerization boundary of the solidifiable photopolymer build material in the projected pixels by applying different exposure parameters to different areas of the image plane and by providing a desired accumulated light intensity equal or exceeding the critical energy at a point within a pixel by setting light intensities of neighboring pixels, wherein setting light intensities of neighboring pixels comprises summing the neighboring pixel's light intensity contributions to the point; and
   f. repeating steps (d) and (e) for each cross-sectional image data until the three-dimensional object is built.

13. The method of claim 12 wherein said bit-map data is formed by:
   i. receiving digital data of a three-dimensional object to be built;
   ii. processing the digital data to form slice data representative of cross-sectional layers of the object; and
   iii. converting the slice data into bit-map data.

14. The method according to claim 12 wherein the digital light projector is further characterized for the light intensity versus the age of a lamp in the digital light projector, and the exposure parameters of the digital light projector are calibrated for the solidifiable photopolymer build material employed.

15. The method according to claim 12 wherein the solidifiable liquid build material is selected from the group consisting of a solidifiable photopolymer liquid resin formulation, a solidifiable photopolymer paste, a solidifiable photopolymer gel, a solidifiable photopolymer semi-liquid and combinations thereof.

16. The method according to claim 12 wherein randomization is introduced into gray scale values at the boundary pixels.

17. The method according to claim 12 wherein the solidifiable photopolymer build material is delivered to the imaging area via a radiation transparent carrier.

18. The method according to claim 17 wherein the image representative of cross-sectional image data is projected through the radiation transparent carrier.

19. The method according to claim 12 wherein the setting the light intensities of neighboring pixels comprises setting the light intensities of eight neighboring pixels.

\* \* \* \* \*